US012145384B2

(12) United States Patent
Asai et al.

(10) Patent No.: US 12,145,384 B2
(45) Date of Patent: Nov. 19, 2024

(54) PRINTING APPARATUS

(71) Applicant: BROTHER KOGYO KABUSHIKI KAISHA, Nagoya (JP)

(72) Inventors: Sho Asai, Ama (JP); Yushi Kato, Nagoya (JP); Shotaro Watanabe, Nagoya (JP); Yusuke Ikemoto, Nagoya (JP); Takehiko Inaba, Chita (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 225 days.

(21) Appl. No.: 17/556,912

(22) Filed: Dec. 20, 2021

(65) Prior Publication Data

US 2022/0203706 A1 Jun. 30, 2022

(30) Foreign Application Priority Data

Dec. 28, 2020 (JP) ................................ 2020-219184

(51) Int. Cl.
*B41J 3/407* (2006.01)
*B41J 15/04* (2006.01)
*B41J 29/13* (2006.01)

(52) U.S. Cl.
CPC ........... *B41J 3/4075* (2013.01); *B41J 15/042* (2013.01); *B41J 29/13* (2013.01)

(58) Field of Classification Search
CPC ......... B41J 15/042; B41J 29/13; B41J 3/4075
See application file for complete search history.

(56) References Cited

U.S. PATENT DOCUMENTS 8,500,058 B2 * 8/2013 Lan ........................ B41J 15/042 242/578
2003/0170065 A1 * 9/2003 Kim ....................... B41J 15/042 400/718
2010/0192746 A1 * 8/2010 Flood ..................... B26D 1/085 83/859
2012/0199687 A1 * 8/2012 Kobayashi ............. B41J 15/046 242/566
2016/0236492 A1 8/2016 Hutnak et al.
2017/0015117 A1 1/2017 Hutnak et al.
2018/0297380 A1 * 10/2018 Ikemoto ................. B65H 16/06
2018/0375405 A1 * 12/2018 Saito .................. G01D 5/24433
2019/0206380 A1 * 7/2019 Hakuta ................ G10K 11/162
2019/0308428 A1 * 10/2019 Kanda .................... B41J 15/042
2022/0195961 A1 * 6/2022 Wilson ...................... F02K 1/72

FOREIGN PATENT DOCUMENTS

JP 2019-181764 A 10/2019
JP 2020041587 A * 3/2020

* cited by examiner

*Primary Examiner* — David H Banh
(74) *Attorney, Agent, or Firm* — KENEALY VAIDYA LLP

(57) ABSTRACT

A printing apparatus includes: a first frame; a second frame fixed to the first frame, the second frame having an accommodation space configured to accommodates a roll, the roll having a printing medium rolled thereon; a pair of support parts supported on the second frame, the pair of support parts being configured to support end faces of the roll in a first direction, at least one of the pair of support parts being supported on the second frame so as to be movable in the first direction; a guide member provided on the first frame; and contact portions provided to the support parts, the contact portions being configured to slide while being in contact with the guide member.

19 Claims, 8 Drawing Sheets

PRINTING APPARATUS

CROSS-REFERENCE TO RELATED APPLICATIONS

This application is based on and claims priority under 35 USC 119 from Japanese Patent Application No. 2020-219184 filed on Dec. 28, 2020, the contents of which are incorporated herein by reference.

TECHNICAL FIELD

The present disclosure relates to a printing apparatus.

BACKGROUND

A related art discloses a printing apparatus configured to hold a roll having a printing medium rolled thereon, to reel out the printing medium from the roll and to perform printing. For example, the related-art printing apparatus has a pair of support parts configured to support a roll. The pair of support parts is supported in grooves provided at a fixing part of a holder and is configured to move along the grooves.

SUMMARY

According to one illustrative aspect of the present disclosure, a printing apparatus includes: a first frame; a second frame fixed to the first frame, the second frame having an accommodation space configured to accommodates a roll, the roll having a printing medium rolled thereon; a pair of support parts supported on the second frame, the pair of support parts being configured to support end faces of the roll in a first direction, at least one of the pair of support parts being supported on the second frame so as to be movable in the first direction; a guide member provided on the first frame; and contact portions provided to the support parts, the contact portions being configured to slide while being in contact with the guide member.

In the present disclosure, the end faces on both sides in the first direction of the roll accommodated in the accommodation space of the second frame are supported by the pair of support parts supported on the second frame. At least one of the pair of support parts is supported to be movable in the first direction. The support part configured to be movable is provided with the contact portion, and the first frame is provided with the guide member. The guide member is configured to contact and slide the contact portion, thereby guiding movement of the support part having the contact portion.

In the present disclosure, the pair of support parts supported on the second frame is provided with the contact portions, and the contact portions are guided while sliding in contact with the guide member provided on the first frame. Specifically, the pair of support parts is supported not only by the second frame but also by the first frame. Thereby, even when a user erroneously applies an excessive force to the support parts at a time of manually moving the support parts, deformation of the second frame is suppressed. As a result, it is possible to smoothly move the support parts.

According to the present disclosure, it is possible to smoothly move the support parts.

BRIEF DESCRIPTION OF THE DRAWINGS

Illustrative embodiments of the disclosure will be described in detail based on the following figures, wherein.

DETAILED DESCRIPTION

In the above-described related-art printing apparatus, when a user applies an excessive force at a time of moving the pair of support parts, for example, the fixing part is slightly deformed, so that a load resistance against movement of the pair of support parts increases.

Therefore, illustrative aspects of the present disclosure provide a printing apparatus that smoothly moves support parts.

Figure 1:
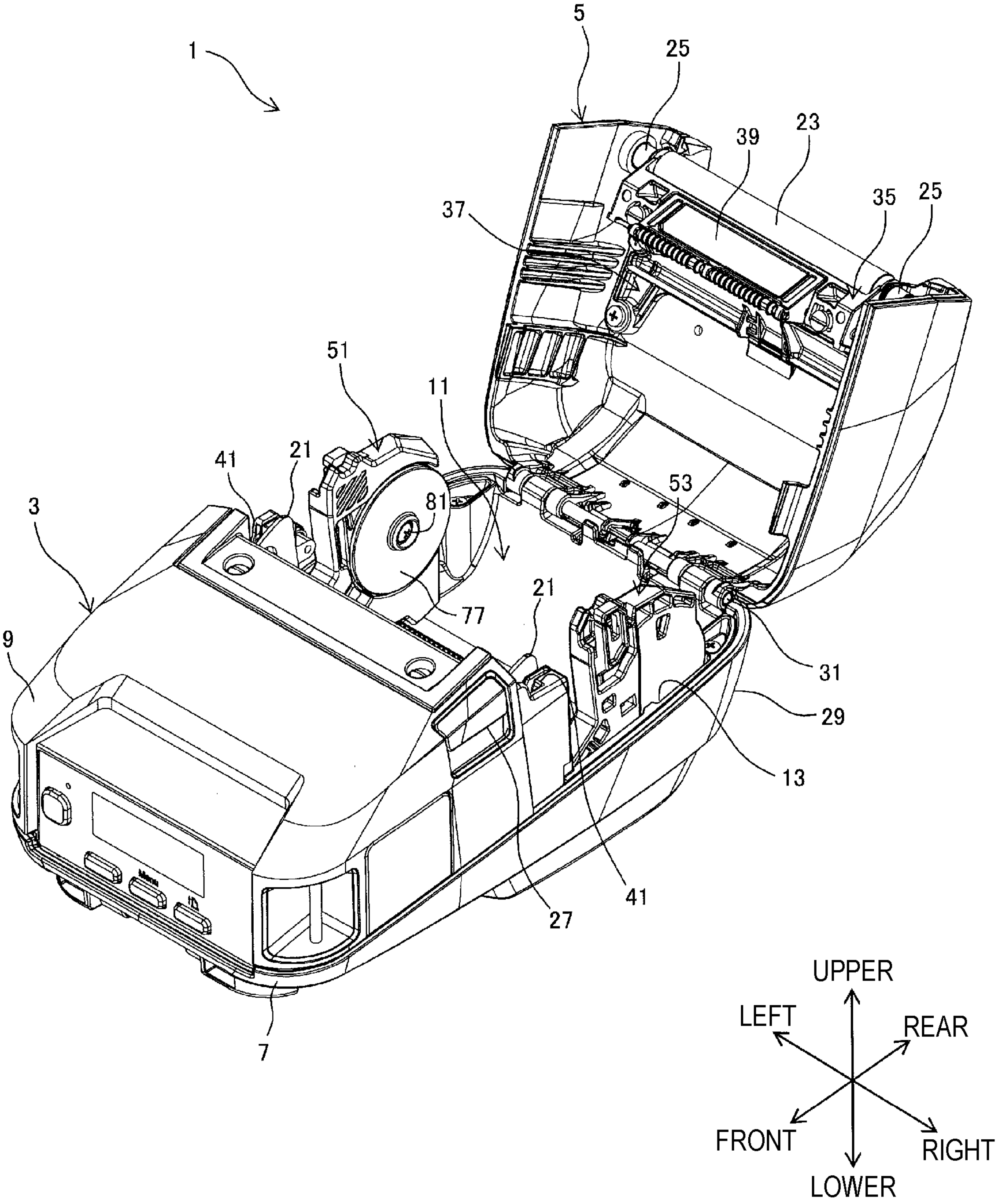
FIG. 1 is a perspective view showing an overall configuration of a printing apparatus in a state where an opening/closing cover is opened, as seen from the upper right front.

Hereinafter, an illustrative embodiment of the present disclosure will be described with reference to the drawings. A printing apparatus 1 is connected to an external terminal (not shown) via a signal cable. The printing apparatus is configured to print characters such as letters, figures and the like on a printing medium, based on print data received from the external terminal. The external terminal is, for example, a general-purpose personal computer (PC). The printing apparatus 1 can be driven by a battery. The printing apparatus 1 is carried and used by a user during an operation by being mounted to a waist belt via a belt clip (not shown). The right lower side, the left upper side, the right upper side, the left lower side, the upper side and the lower side in FIG. 1 are each defined as the right side, the left side, the rear side, the front side, the upper side and the lower side. Note that, the right and left direction is an example of the first direction, and the upper and lower direction is an example of the second direction.

1. Overall Configuration of Printing Apparatus

Figure 2:
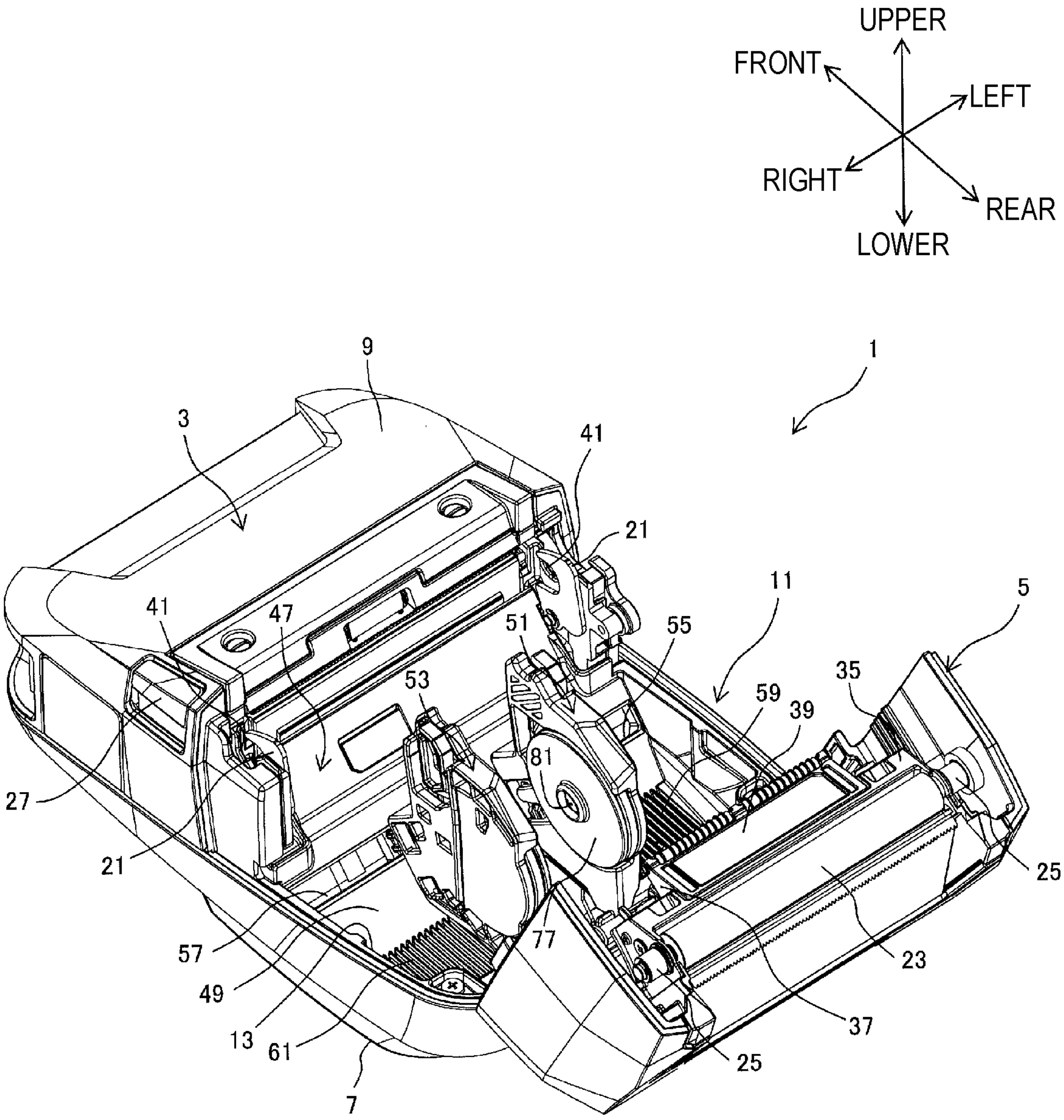
FIG. 2 is a perspective view showing the overall configuration of the printing apparatus in a state where the opening/closing cover is opened, as seen from the upper right rear.
Figure 3:
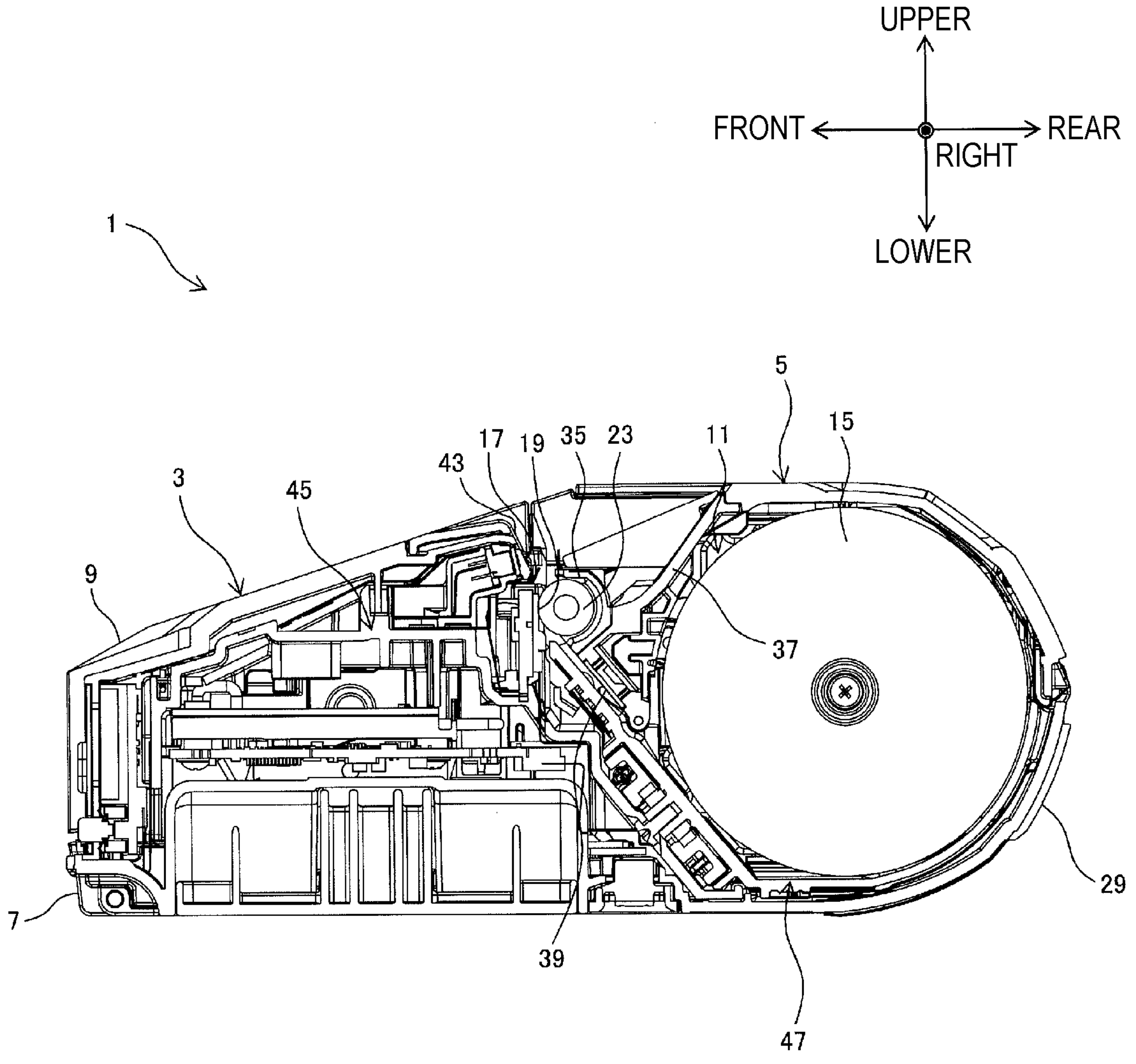
FIG. 3 is a sectional view showing a sectional configuration of the printing apparatus in a state where the opening/closing cover is closed.

FIGS. 1 and 2 show an overall configuration of a printing apparatus in a state where an opening/closing cover is opened. FIG. 3 shows a sectional configuration of the printing apparatus in a state where the opening/closing cover is closed.

As shown in FIGS. 1 to 3, a printing apparatus 1 has a main body 3 and an opening/closing cover 5. The main body 3 and the opening/closing cover 5 are formed, for example, by a synthetic resin. The main body 3 has a substantially cuboid shape, and has a bottom part 7 and a front-side covering part 9. The bottom part 7 is configured to cover an internal area of the printing apparatus 1 from the lower side. The front-side covering part 9 is configured to cover a substantial front-side half of the internal area of the printing apparatus 1 from the upper side. An accommodation part 11 is provided at a substantial rear-side half part of the bottom part 7. The accommodation part 11 is an example of the accommodation space configured to accommodate a roll. As shown in FIGS. 1 and 2, an upper side of the accommodation part 11 is opened by an opening part 13 formed at the main body 3.

As shown in FIG. 3, a roll 15 is accommodated in the accommodation part 11. The roll 15 is configured by rolling a tape, which is a long mount on which a plurality of heat-sensitive labels is discretely pasted, on a cylindrical core. The tape is an example of the printing medium. A front end portion of the opening part 13 of the main body 3 is provided with a cutting blade 17. The cutting blade 17 is configured to cut a printed part of the tape. A thermal head 19 is provided below the cutting blade 17. The thermal head 19 is configured to print a character on the heat-sensitive label by heating. The cutting blade 17 and the thermal head 19 each extend in the right and left direction.

As shown in FIGS. 1 and 2, both left and right end portions of the opening part 13 of the main body 3 are provided with locking portions 21. A lower end portion of each locking portion 21 is supported so that an upper end portion can swing. The opening/closing cover 5 is provided with a platen holder 35 configured to rotatably support a platen roller 23. When the opening/closing cover 5 is located in a closed position (refer to FIG. 3), the locking portions 21 are each locked to bearings 25 provided at both ends of the platen roller 23 of the opening/closing cover 5. When a lever 27 provided on a right side surface of the main body 3 is pushed down by a user, the upper end portion of each locking portion 21 swings rearward to release the locking to the bearing 25.

As shown in FIG. 1, the opening/closing cover 5 is supported to the main body 3 to be swingable between the closed position and an opened position by a support shaft 31 extending in the right and left direction and provided at an upper end portion of a rear wall 29 of the main body 3. The opening/closing cover 5 covers the upper side of the accommodation part 11 when located in the closed position (refer to FIG. 3). The opening/closing cover 5 opens the accommodation part 11 when located in the opened position (refer to FIGS. 1 and 2). The opening/closing cover 5 is urged in a swinging direction from the closed position toward the opened position by an urging member (not shown).

As shown in FIGS. 1 to 3, the platen holder 35 is disposed at a front end portion of the opening/closing cover 5. The platen holder 35 is configured to rotatably support the platen roller 23. The platen roller 23 is configured to convey the tape in a position that faces the thermal head 19 at a time when the opening/closing cover 5 is located in the closed position. A rotary shaft of the platen roller 23 extends in the right and left direction. The rotary shaft of the platen roller 23 is rotatably supported by the cylindrical bearings 25 disposed on outer sides in the right and left direction of both end portions of the platen roller 23. The bearing 25 is held by the platen holder 35.

The platen holder 35 is provided at a sensor holder 37. The sensor holder 37 is provided on a front side of the opening/closing cover 5. Specifically, the platen holder 35 is provided at the opening/closing cover 5 via the sensor holder 37. The sensor holder 37 is configured to support a sensor 39 configured to detect presence or absence of the tape that is conveyed by the platen roller 23. The sensor 39 is, for example, an optical reflection sensor.

As shown in FIGS. 1 and 2, each concave portion 41 of the main body 3 is configured to receive the corresponding bearing 25 from the lower side at a time when the opening/closing cover 5 is located in the closed position. Each locking portion 21 is locked to the corresponding bearing 25 from the upper side at a time when the opening/closing cover 5 is located in the closed position. Thereby, the opening/closing cover 5 is held in the closed position. When the lever 27 is pushed down in the state where the opening/closing cover 5 is in the closed position, each locking portion 21 separates from the corresponding bearing 25. The opening/closing cover 5 swings from the closed position (refer to FIG. 3) to the opened position (refer to FIGS. 1 and 2) by an urging force of the urging member.

As shown in FIG. 3, the thermal head 19 and the platen roller 23 comes close to each other when the opening/closing cover 5 is in the closed position. In a case where the tape is disposed between the platen roller 23 and the thermal head 19, the platen roller 23 presses the tape toward the thermal head 19. The platen roller 23 is rotated by drive of a motor (not shown), thereby conveying the tape while pressing the tape against the thermal head 19. The tape printed by the thermal head 19 is discharged to an outside through a discharge port 43.

As shown in FIG. 3, a first frame 45 is provided in a region on a front side within the main body 3. The first frame 45 is formed of a fiber reinforced resin material in which glass fibers and the like are contained. A second frame 47 is provided in a region on a rear side within the main body 3. The second frame 47 is fixed to the first frame 45 and configures the accommodation part 11 configured to accommodate the roll 15. The second frame 47 is formed of a normal resin material, not the fiber reinforced resin material. Therefore, the first frame 45 has rigidity higher than the second frame 47. The first frame 45 is configured to support a control substrate, a communication substrate, a power supply substrate, a motor, a head holder on which the thermal head 19 is held, and the like.

As shown in FIG. 2, the second frame 47 has a second holding plate part 49 having a substantially rectangular flat plate shape on a front side of the accommodation part 11. In the accommodation part 11, a pair of support parts 51 and 53 is provided. The pair of support parts 51 and 53 includes a first support part 51 and a second support part 53. The pair of support parts 51 and 53 is supported on the second frame 47 and is configured to support end faces in the right and left direction of the roll 15. Specifically, the roll 15 is rotatably supported by the pair of support parts 51 and 53 in a posture where a shaft center direction faces toward the right and left direction. The pair of support parts 51 and 53 is supported by the second frame 47 so that both can be moved in the right and left direction by an adjusting mechanism 63 (refer to FIGS. 4 to 6).

The second holding plate part 49 extends upward obliquely forward from a lower end portion of the accommodation part 11. The second holding plate part 49 has a first groove 55 and a second groove 57 each extending in the right and left direction. The grooves 55 and 57 are linearly aligned in the right and left direction and are spaced in the right and left direction. The first groove 55 is disposed at the left of the second groove 57.

The accommodation part 11 has engaging parts 59 and 61 at a lower end portion on a rear side of the second holding plate part 49. The engaging parts 59 and 61 are aligned in the right and left direction and each have a plurality of teeth extending in the front and rear direction. The engaging part 59 and 61 are linearly aligned in the right and left direction and are spaced in the right and left direction. The engaging part 59 is disposed at the left of the engaging part 61.

2. Configurations of Support Part and Adjusting Mechanism

FIGS. 4 to 8 show configurations of the pair of support parts 51 and 53 and the adjusting mechanism 63. In FIGS. 4 to 8, each direction of the printing apparatus 1 shown in FIGS. 1 to 3 is applied to the support parts 51 and 53 and the adjusting mechanism 63.

Figure 4:
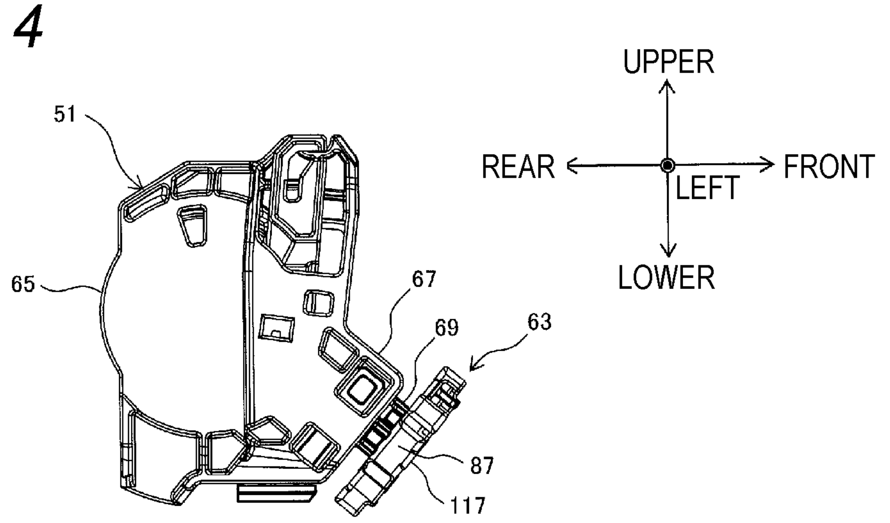
FIG. 4 is a side view showing configurations of a first support part and an adjusting mechanism, as seen from the left.
Figure 5:
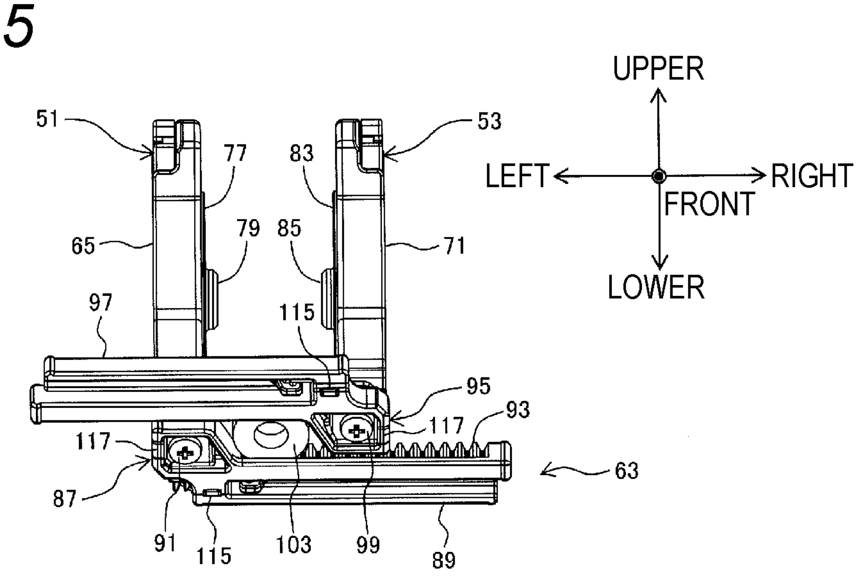
FIG. 5 is a perspective view showing configurations of the first support part, a second support part and the adjusting mechanism, as seen from the front.
Figure 6:
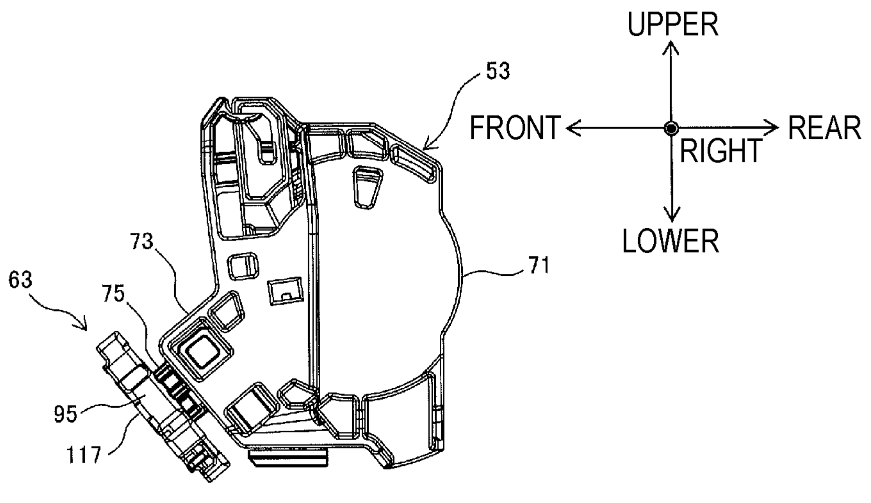
FIG. 6 is a side view showing configurations of the second support part and the adjusting mechanism, as seen from the right.

As shown in FIGS. 4 to 6, the pair of support parts 51 and 53 has a bilaterally symmetrical structure. As shown in FIG. 4, the first support part 51 has a main body portion 65, an extension portion 67 and a protrusion portion 69. As shown in FIG. 6, the second support part 53 has a main body portion 71, an extension portion 73 and a protrusion portion 75.

As shown in FIG. 5, the main body portion 65 of the first support part 51 has a rotating plate 77 on a right side surface. As shown in FIGS. 1 and 2, the rotating plate 77 has a circular plate shape. A plane of the rotating plate 77 is orthogonal to the right and left direction. A center of the rotating plate 77 is formed with a hole 79, and a screw 81 is inserted in the hole 79, as shown in FIGS. 1 and 2. A right contact surface of the rotating plate 77 is in contact with a left end face of the roll 15 and is configured to rotatably hold the roll 15.

As shown in FIG. 4, the extension portion 67 extends downward obliquely forward from a portion lower than a substantial center in the upper and lower direction of a front end portion of the main body portion 65. The protrusion portion 69 protrudes downward obliquely forward from an end portion on a front oblique lower side of the extension portion 67. The protrusion portion 69 is inserted into the first groove 55 provided to the second holding plate part 49 from the rear side, and further protrudes forward than the second holding plate part 49. The protrusion portion 69 is engaged with the first groove 55 so as to be movable in the right and left direction while being restrained from moving in the upper and lower direction.

As shown in FIG. 5, the main body portion 71 of the second support part 53 has a rotating plate 83 on a left side surface. Similar to the rotating plate 77, the rotating plate 83 has a circular plate shape. A plane of the rotating plate 83 is orthogonal to the right and left direction. A center of the rotating plate 83 is formed with a hole 85, and a screw (not shown) is inserted in the hole 85. A left contact surface of the rotating plate 83 is in contact with a right end face of the roll 15 and is configured to rotatably hold the roll 15.

As shown in FIG. 6, the extension portion 73 extends downward obliquely forward from a portion lower than a substantial center in the upper and lower direction of a front end portion of the main body portion 71. The protrusion portion 75 protrudes downward obliquely forward from an end portion on a front oblique lower side of the extension portion 73. The protrusion portion 75 is inserted into the second groove 57 provided to the second holding plate part 49 from the rear side, and further protrudes forward than the second holding plate part 49. The protrusion portion 75 is engaged with the second groove 57 so as to be movable in the right and left direction while being restrained from moving in the upper and lower direction.

The adjusting mechanism 63 is configured to interlockingly move at least one of the pair of support parts 51 and 53 in the right and left direction. The adjusting mechanism 63 is disposed ahead of the second holding plate part 49. As shown in FIG. 5, the first support part 51 has a first base portion 87 and a first rack member 89. The first base portion 87 is fixed to a lower end of the protrusion portion 69 by a screw 91. The protrusion portion 69 and the first base portion 87 are an example of the first guide part. The first rack member 89 extends rightward in a position offset downward from the first base portion 87 and is formed on an upper side with a first rack gear 93. The second support part 53 has a second base portion 95 and a second rack member 97. The second base portion 95 is fixed to a lower end of the protrusion portion 75 by a screw 99. The protrusion portion 75 and the second base portion 95 are an example of the second guide part. The second rack member 97 extends leftward in a position offset upward from the second base portion 95 and is formed on a lower side with a second rack gear 101 (refer to FIG. 11).

Figure 9:
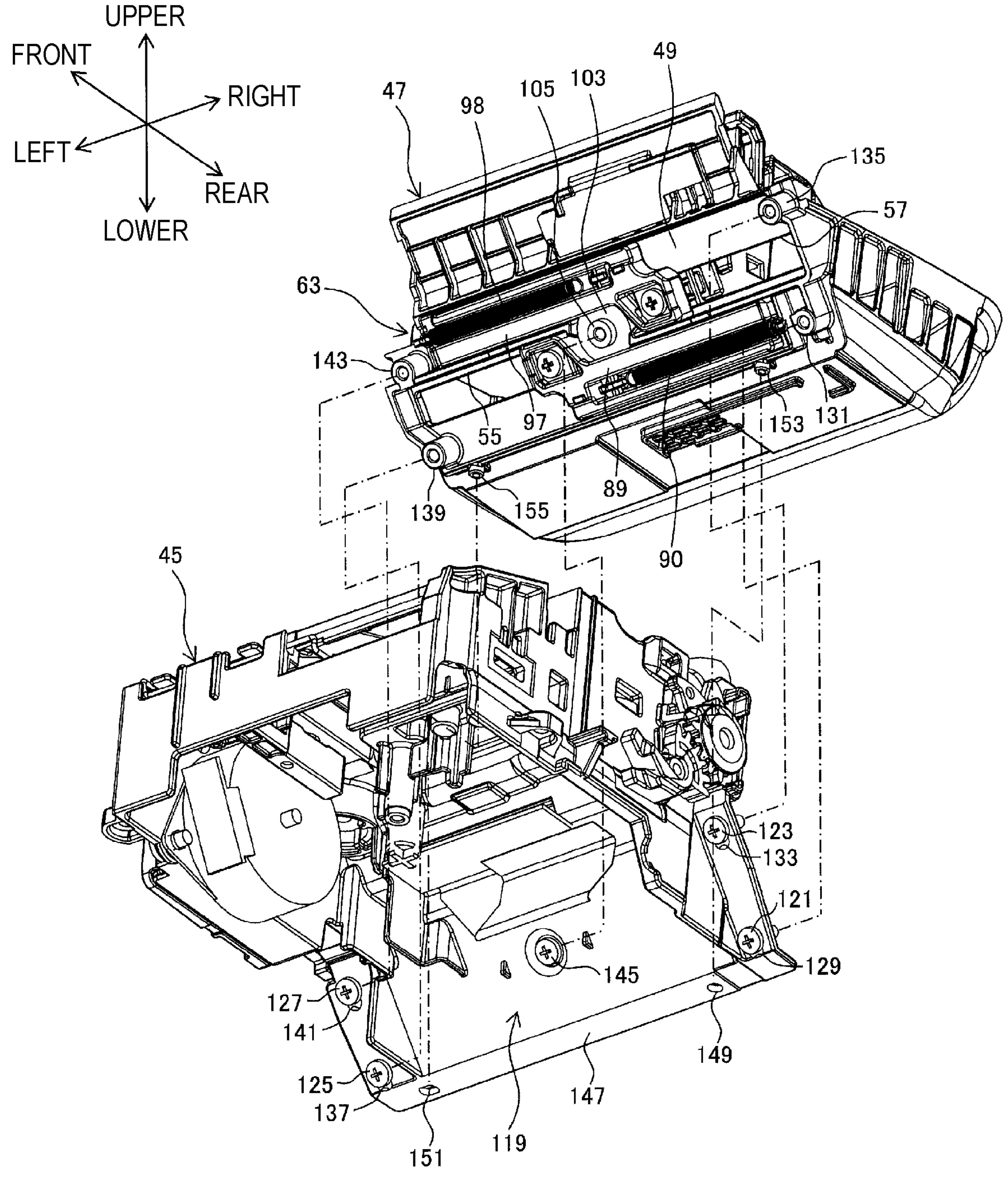
FIG. 9 is an exploded perspective view showing a fixing structure of the first frame and the second frame.

The first rack gear 93 and the second rack gear 101 are in mesh with a pinion gear 103. The pinion gear 103 has a through-hole formed at a center. As shown in FIG. 9, a support shaft portion 105 provided at a substantially central position of the second holding plate part 49 is inserted in the through-hole of the pinion gear 103. Thereby, the pinion gear 103 is rotatably supported by the support shaft portion 105. In this way, the adjusting mechanism 63 has the first base portion 87, the first rack member 89, the second base portion 95, the second rack member 97 and the pinion gear 103.

The first rack gear 89 and the second rack gear 97 are each configured to move in the right and left direction as the pinion gear 103 rotates. In association with this, the pair of support parts 51 and 53 is moved in the right and left direction along the grooves 55 and 57. For example, when the first support part 51 moves leftward by a predetermined amount, the second support part 53 moves rightward by a predetermined amount in conjunction with the movement of the first support part 51 via the first base portion 87, the first rack member 89, the pinion gear 103, the second rack member 97, and the second base portion 95. Specifically, the adjusting mechanism 63 is configured to move the pair of support parts 51 and 53 in a direction of getting away from each other (outward in the right and left direction). Similarly, when the first support part 51 moves rightward by a predetermined amount, the second support part 53 moves leftward by a predetermined amount in conjunction with the movement of the first support part 51. Specifically, the adjusting mechanism 63 is configured to move the pair of support parts 51 and 53 in a direction of coming close to each other (inward in the right and left direction). As shown in FIG. 9, the first rack member 89 is urged rightward by a first tension spring 90 bridged in the right and left direction. The second rack member 97 is urged leftward by a second spring 98 bridged in the right and left direction. Thereby, the pair of support parts 51 and 53 is urged toward each other (inward in the right and left direction).

Figure 7:
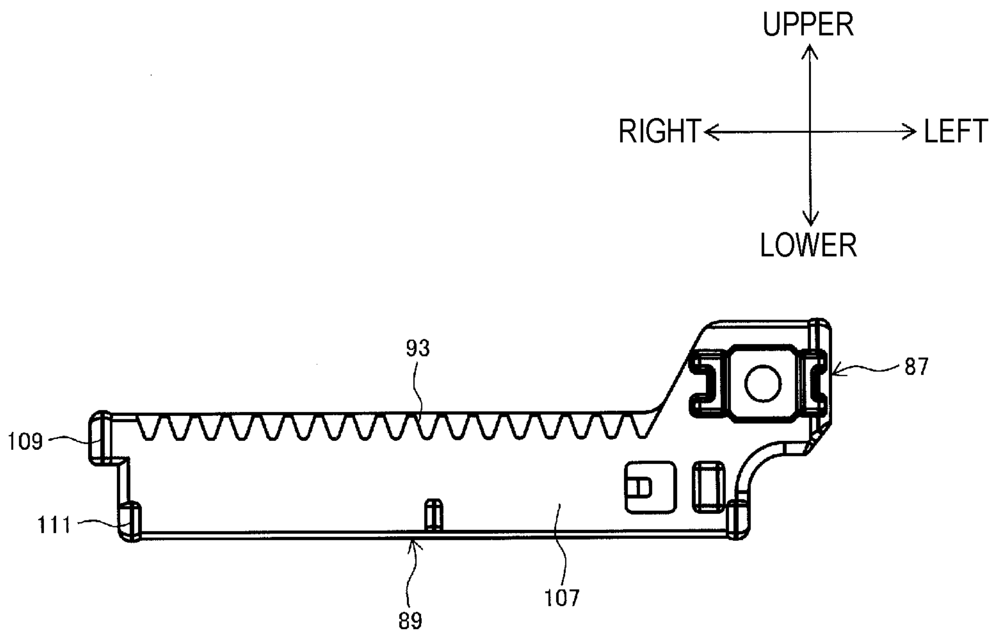
FIG. 7 is a plan view showing configurations of a first base portion and a first rack member, as seen from a second frame-side.

As shown in FIG. 7, a facing surface 107 of the first rack member 89, which faces the second holding plate part 49, is provided with contact portions 109 and 111 on both sides in the upper and lower direction of a right tip end portion. The contact portions 109 and 111 are each formed as a substantially rectangular protruding portion, and each extend in the upper and lower direction. The contact portions 109 and 111 each protrude from the facing surface 107 in a direction perpendicular to the facing surface 107 by a predetermined amount. The contact portions 109 and 111 of the first rack member 89 are in contact with a front-side surface of the second holding plate part 49 of the second frame 47. The facing surface 107 of the first rack member 89 is not in contact with the front-side surface of the second holding plate part 49 of the second frame 47.

Figure 8:
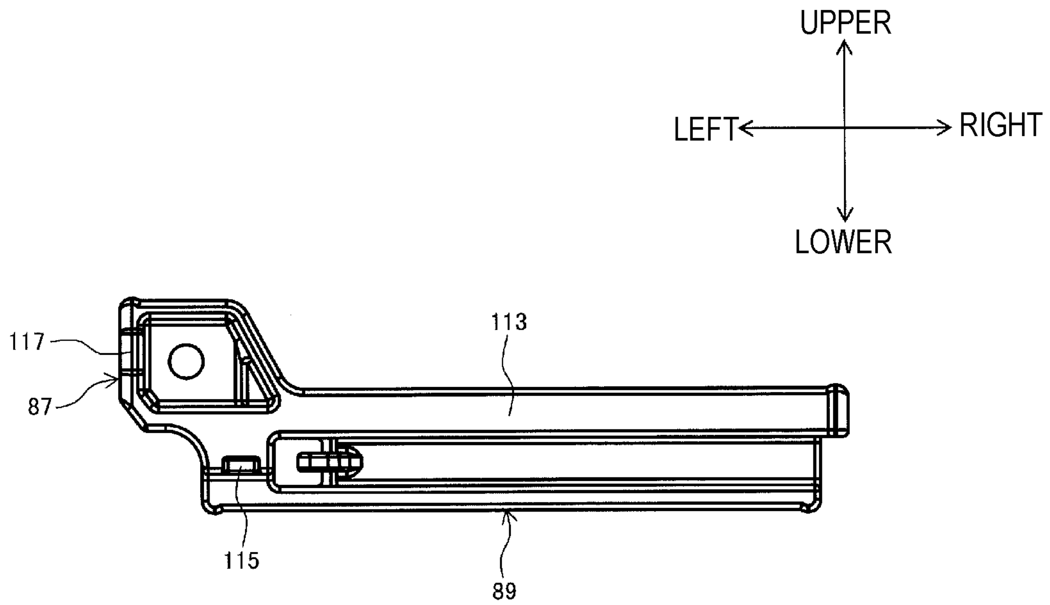
FIG. 8 is a plan view showing the configurations of the first base portion and the first rack member, as seen from a first frame-side.

As shown in FIG. 8, a facing surface 113 of the first rack member 89, which faces a first holding plate part 119 (refer to FIGS. 9 and 10) of the first frame 45, is provided with contact portions 115 and 117. The contact portion 115 is provided in the vicinity of a left end portion of the first rack member 89. The contact portion 115 is formed as a substantially rectangular protruding portion, and extends in the right and left direction. The contact portion 115 protrudes from the facing surface 113 in a direction perpendicular to the facing surface 113 by a predetermined amount. The contact portion 115 is in contact with the first frame 45 to prevent the first support part 51 from falling down in the right and left direction. The contact portion 115 is an example of the first contact portion, and the vicinity of the left end of the first rack member 89 is an example of the predetermined first position of the first guide part.

The contact portion 117 is provided at a left end portion of the first base portion 87. The contact portion 117 is formed as a substantially rectangular protruding portion, and extends in the upper and lower direction. The contact portion 117 protrudes from the facing surface 113 in a direction perpendicular to the facing surface 113 by a predetermined amount. The contact portion 117 is in contact with the first frame 45 to prevent the first support part 51 from falling down in the upper and lower direction. The contact portion 117 is an example of the second contact portion, and the left end portion of the first base portion 87 is an example of the second position different from the first position of the first guide part.

The contact portions 115 and 117 of the first rack member 89 are in contact with a rear-side surface of the first holding plate part 119 of the first frame 45. Here, although the contact portions 115 and 117 are configured to be in contact with the guide members (which will be described later) provided on the first frame 45, the contact portions 115 and 117 are described as being in contact with the rear-side surface of the first holding plate part 119 of the first frame 45, for convenience. The portions of the first rack member 89 except the contact portions 115 and 117 are not in contact with the rear-side surface of the first holding plate part 119 of the first frame 45. The contact portion 115 and the contact portion 117 are disposed offset by predetermined distances in the upper and lower direction and in the right and left direction, and are also formed so that extension directions thereof are substantially orthogonal to each other. When the user manually moves the first support part 51 in the right and left direction, the first support part 51 is also applied with a force in a direction of being pushed toward the first frame 45. At this time, since the contact portions 115 and 117 are in contact with the rear-side surface of the first holding plate part 119 of the first frame 45, the first support part 51 is supported by the first frame 45. In addition, when the first support part 51 is applied with the force in the direction of being pushed toward the first frame 45, the first rack member 89 is likely to be inclined in a direction in which the right end portion gets away from the first frame 45, i.e., comes close to the second holding plate part 49 of the second frame 47. At this time, since the contact portions 109 and 111 are in contact with the front-side surface of the second holding plate part 49 of the second frame 47, the right end portion of the first rack member 89 is supported by the second frame 47. In addition, since the contact portions 115 and 117 and the contact portions 109 and 111 are formed small, contact areas can be reduced, so that it is possible to reduce a friction resistance when moving the first support part 51.

Note that, since the first rack member 89 and the second rack member 97 have the equivalent structure, the description of the second rack member 97 is omitted.

3. Fixing Structure of First Frame and Second Frame

Figure 10:
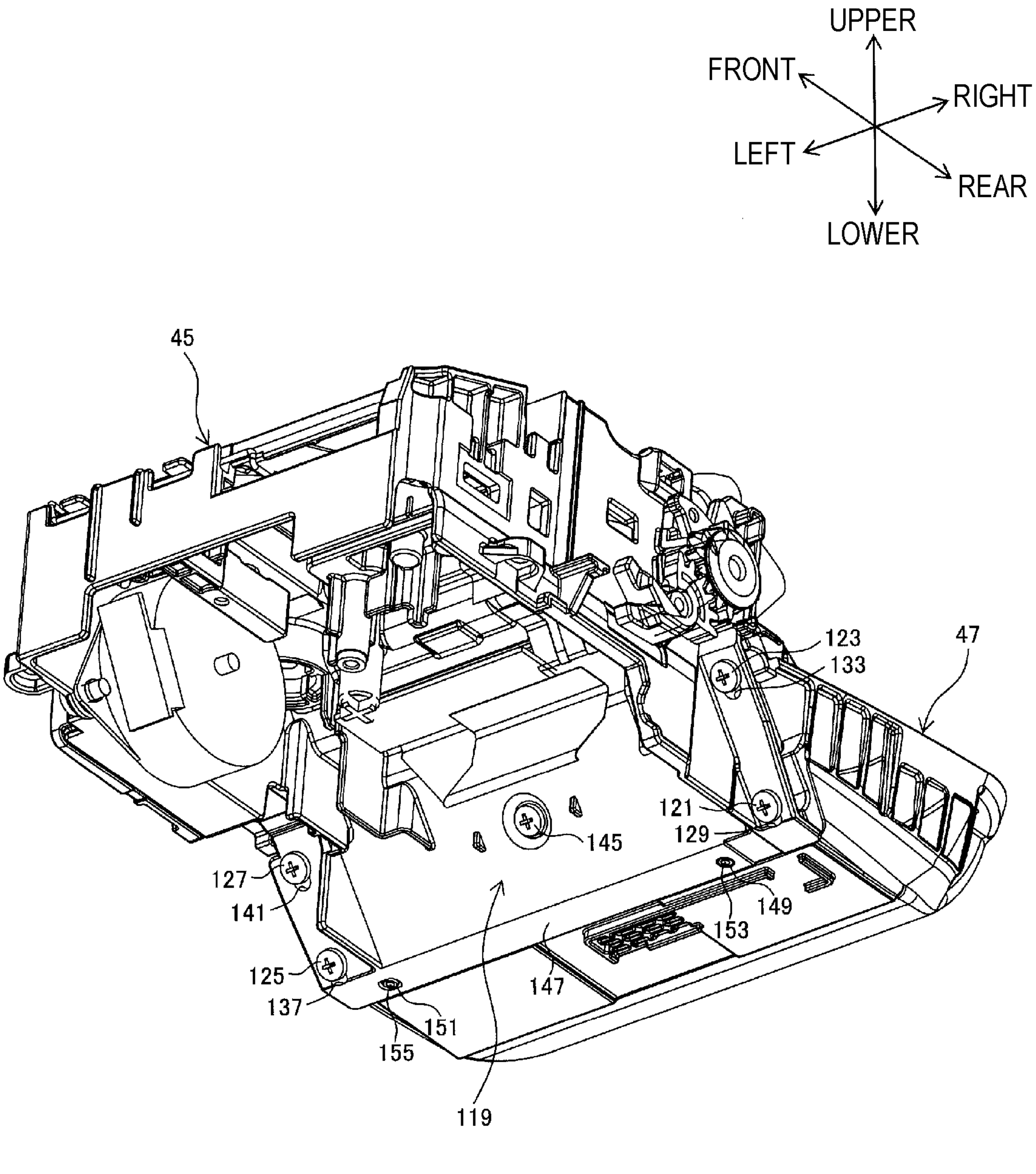
FIG. 10 is a perspective view showing a state where the first frame and the second frame are fixed.

FIGS. 9 and 10 show a fixing structure of the first frame 45 and the second frame 47. In FIGS. 9 and 10, each direction of the printing apparatus 1 shown in FIGS. 1 to 3 is applied to the first frame 45 and the second frame 47.

As shown in FIGS. 9 and 10, the first frame 45 has a first holding plate part 119 having a substantially rectangular flat plate shape. The second frame 47 has the second holding plate part 49 having a substantially rectangular flat plate shape where the first groove 55 and the second groove 57 are formed. The first holding plate part 119 and the second holding plate part 49 are disposed to face each other substantially in parallel. The adjusting mechanism 63 having the first rack member 89, the second rack member 97 and the pinion gear 103 is interposed between the first holding plate part 119 and the second holding plate part 49. The first holding plate part 119 and the second holding plate part 49 are fixed at four corner portions, which are end portions on both sides in the right and left direction and are end portions on both sides in the upper and lower direction, by four screws 121, 123, 125 and 127. The screws 121, 123, 125 and 127 are an example of the first fastening member.

As shown in FIG. 9, the screw 121 passes through a through-hole 129 formed at the right lower corner portion of the first holding plate part 119 and is fixed to a boss 131 provided at the right lower corner portion of the second holding plate part 49. The screw 123 passes through a through-hole 133 formed at the right upper corner portion of the first holding plate part 119 and is fixed to a boss 135 provided at the right upper corner portion of the second holding plate part 49. The screw 125 passes through a through-hole 137 formed at the left lower corner portion of the first holding plate part 119 and is fixed to a boss 139 provided at the left lower corner portion of the second holding plate part 49. The screw 127 passes through a through-hole 141 formed at the left upper corner portion of the first holding plate part 119 and is fixed to a boss 143 provided at the left upper corner portion of the second holding plate part 49.

As shown in FIG. 9, the second holding plate part 49 has the support shaft portion 105 provided at a substantially central position and configured to rotatably support the pinion gear 103 inserted therein. The first holding plate part 119 is fixed to the support shaft portion 105 by a screw 145 passing through a through-hole (not shown) formed at a substantially central position. The screw 145 is an example of the second fastening member.

As shown in FIGS. 9 and 10, the first holding plate part 119 has a bottom portion 147 provided at a lower end portion. The bottom portion 147 is a plate-shaped member extending in the right and left direction, and is bent at the lower end portion of the first holding plate part 119 and protrudes rearward. Two positioning holes 149 and 151 are each formed in the vicinity of each of both ends of the bottom portion 147 in the right and left direction. The second holding plate part 49 has two bosses 153 and 155 protruding downward and provided in positions corresponding to the positioning holes 149 and 151 in the vicinity of the lower end portion. The boss 153 is inserted and fitted in the positioning hole 149. The boss 155 is inserted and fitted in the positioning hole 151.

4. Structure of Guide Members of First Frame

Figure 11:
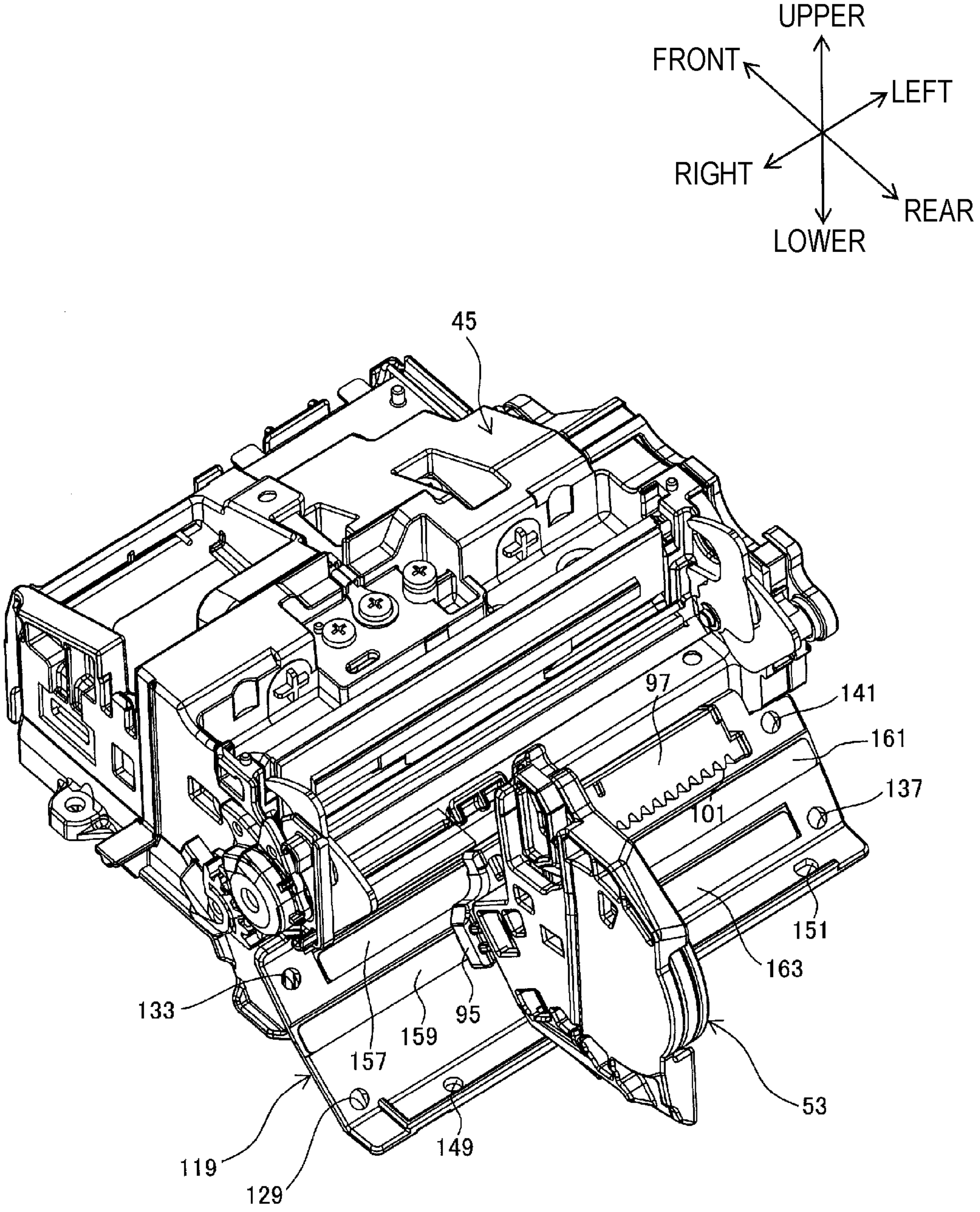
FIG. 11 is a perspective view showing a structure of a guide member of the first frame, as seen from the upper right rear.

FIG. 11 shows a structure of guide members of the first frame 45. In FIG. 11, the second frame 47, the first support part 51, the first base portion 87, the first rack member 89 and the like are not shown. In FIG. 11, each direction of the printing apparatus 1 shown in FIGS. 1 to 3 is applied to the first frame 45.

Four guide members 157, 159, 161 and 163 are provided on a rear-side surface of the first holding plate part 119 of the first frame 45. The guide member 157 extends in the right and left direction over a substantial right half region at the upper part of the first holding plate part 119. The contact portion 115 provided in the vicinity of the right end portion of the second rack member 97 of the second support part 53 is configured to slide in the right and left direction with being in contact with the guide member 157. The guide member 159 extends in the right and left direction over a substantial right half region at the central part of the first holding plate part 119 in the upper and lower direction. The contact portion 117 provided at the right end portion of the second base portion 95 of the second support part 53 is configured to slide in the right and left direction with being in contact with the guide member 159.

The guide member 161 extends in the right and left direction over a substantial left half region at the central part of the first holding plate part 119 in the upper and lower direction. The contact portion 117 provided at the left end portion of the first base portion 87 of the first support part 51 (not shown) is configured to slide in the right and left direction with being in contact with the guide member 161. The guide member 163 extends in the right and left direction over a substantial left half region at the lower part of the first holding plate part 119. The contact portion 115 provided in the vicinity of the left end portion of the first rack member 89 of the first support part 51 (not shown) is configured to slide in the right and left direction with being in contact with the guide member 163.

The guide members 159 and 161 are linearly aligned in the right and left direction and are spaced in the right and left direction. The pinion gear 103 is disposed between the guide members 159 and 161. The guide members 157, 159, 161 and 163 are each a tape-shaped member where a surface in contact with the contact portion 115 or 117 has been subjected to a friction resistance reducing treatment, for example. The guide members 157, 159, 161 and 163 are each accommodated in each of concave parts each having a shape corresponding to each of the guide members 157, 159, 161 and 163. The surfaces of the guide members 157, 159, 161 and 163 with which the contact portions 115 and 117 are in contact are substantially flush with the rear-side surface of the first holding plate part 119. The contact portions 115 and 117 may always contact the guide members 157, 159, 161 and 163. The contact portion 115 or 117 may not always contact the guide members 157, 159, 161 and 163. For example, the contact portion 115 or 117 may be in contact with the guide members 157, 159, 161 and 163 when the support parts 51 and/or 53 is moved. The contact portion 115 or 117 may be in contact with the guide members 157, 159, 161 and 163 in a case the user erroneously applies an excessive force to the support parts 51 and 53 in a case of manually moving the support parts 51 and 53.

5. Advantages of Illustrative Embodiment

In the printing apparatus 1 of the illustrative embodiment as described above, the end faces on both sides in the right and left direction of the roll 15 accommodated in the accommodation part 11 of the second frame 47 are supported by the pair of support parts 51 and 53 supported on the second frame 47. Both the pair of support parts 51 and 53 are supported to be movable in the right and left direction. The support parts 51 and 53 configured to be movable are each provided with the contact portions 115 and 117, and the first frame 45 is provided with the guide members 157, 159, 161 and 163. The guide members 157, 159, 161 and 163 are configured to slide the contact portions 115 and 117 with being in contact with the contact portions, thereby guiding movement of the support parts 51 and 53 having the contact portions 115 and 117.

In the present illustrative embodiment, the pair of support parts 51 and 53 supported on the second frame 47 is provided with the contact portions 115 and 117, and the contact portions 115 and 117 are guided while sliding in contact with the guide members 157, 159, 161 and 163 provided on the first frame 45. Specifically, the pair of support parts 51 and 53 is supported not only by the second frame 47 but also by the first frame 45. Thereby, even when the user erroneously applies an excessive force to the support parts 51 and 53 at a time of manually moving the support parts 51 and 53, deformation of the second frame 47 is suppressed. As a result, it is possible to smoothly move the support parts 51 and 53.

Further, in the present illustrative embodiment, particularly, the pinion gear 103 provided on the second frame 47 is in mesh with each of the first rack gear 93 and the second rack gear 101 of the first rack member 89 and the second rack member 97. Thereby, the first rack member 89 and the second rack member 97 are configured to move in the right and left direction in conjunction with each other via rotation of the pinion gear 103. When moving, the protrusion portions 69 and 75 of the support parts 51 and 53 are guided engaged with the first groove 55 and the second groove 57 provided to the second frame 47. The contact portions 115 and 117 are provided at portions, which face the first frame 45, of the first base portion 87 and the second base portion 95, and the two contact portions 115 and 117 are guided while sliding in contact with the guide members 157, 159, 161 and 163 provided on the first frame 45.

As described above, in the present illustrative embodiment, the first rack member 89 and the second rack member 97 are moved in conjunction with each other by rotation of the pinion gear 103. Thereby, when the user simply manually operates any one of the pair of support parts 51 and 53, the other of the pair of support parts 51 and 53 can also be smoothly moved in an interlocking manner.

Further, in the present illustrative embodiment, particularly, the contact portions 115 each extending in the right and left direction are provided in the vicinity of the left end portion of the first rack member 89 and in the vicinity of the right end portion of the second rack member 97, as the contact portion. Thereby, while preventing the first support part 51 and the second support part 53 from falling down in the right and left direction, it is possible to smoothly move the first and second support parts toward one side and the other side in the right and left direction.

Further, in the present illustrative embodiment, particularly, the contact portions 117 each extending in the upper and lower direction are provided at the left end portion of the first base portion 87 and at the right end portion of the second base portion 95. Thereby, while preventing the first support part 51 and the second support part 53 from falling down in the upper and lower direction, it is possible to smoothly move the first and second support parts toward one side and the other side in the right and left direction.

Further, in the present illustrative embodiment, particularly, the first frame 45 and the second frame 47 are each provided with the first holding plate part 119 and the second holding plate part 49 each having a substantially rectangular flat plate shape. The first rack member 89, the second rack member 97 and the pinion gear 103 are interposed between the first holding plate part 119 and the second holding plate part 49. The first holding plate part 119 and the second holding plate part 49 are fastened via the screws 121, 123, 125 and 127, so that the first frame 45 and the second frame 47 are fixed. According to the present illustrative embodiment, it is possible to support the pair of support parts 51 and 53 by the first frame 45 and the second frame 47 firmly fixed and integrated as described above.

Further, in the present illustrative embodiment, particularly, the support shaft portion 105 is provided in the substantially central position of the second holding plate part 49, and the first holding plate part 119 is fixed to the support shaft portion 105 via the fastening of the first holding plate part 119 by the screw 145. Thereby, the central part of the first holding plate part 119 distant from the four corners of the first holding plate part 119 fixed by the screws 121, 123, 125 and 127 can be firmly fixed to the second holding plate part 49-side.

Further, in the present illustrative embodiment, particularly, the contact-side surfaces of the guide members 157, 159, 161 and 163 with the contact portions 115 and 117 have been subjected to the friction resistance reducing treatment. Thereby, the friction resistance at a time when the contact portions 115 and 117 slide in contact with the guide members 157, 159, 161 and 163 is reduced to smoothly move the support parts 51 and 53.

Further, in the present illustrative embodiment, particularly, the pair of support parts 51 and 53 is supported not only by the second frame 47 formed of the normal resin material but also by the first frame 45 formed of the fiber reinforced resin material. Thereby, even when the excessive force is applied to the support parts 51 and 53 during movement of the support parts 51 and 53, deformation of the second frame 47 is suppressed, so that the support parts 51 and 53 can be smoothly moved.

Note that, in the above descriptions, when the terms 'vertical', 'parallel', and 'plane' are used, these terms may not necessarily mean 'vertical', 'parallel', and 'plane', respectively, in a strict sense. Specifically, the terms 'vertical', 'parallel', and 'plane' mean 'substantially vertical', 'substantially parallel', and 'substantial plane', respectively, with design-related and production-related tolerance and error taken into consideration.

Note that, in the above descriptions, when the terms 'same', 'equivalent', and 'different' are used in the context of dimensions or sizes of external appearance, these terms may not necessarily mean 'same', 'equivalent', and 'different', respectively, in a strict sense. Specifically, the terms 'same', 'equivalent', and 'different' mean 'substantially same', 'substantially equivalent', and 'substantially different', respectively, with design-related and production-related tolerance and error taken into consideration.

Also, other than mentioned above, the above illustrative embodiment and methods of each of the modified illustrative embodiments may be combined for use as appropriate.

Although not specifically exemplified, the present invention is put into practice with various changes made within a range not departing from the scope of the present invention.

What is claimed is:

1. A printing apparatus comprising:

a first frame having a first side and a second side in a first direction;

a second frame fixed to the first frame, the second frame having an accommodation space configured to accommodate a roll, the roll having a printing medium rolled thereon, and the first frame is fixed to the second frame by fastening members, the fastening members including:

a first pair of fastening members, that attach the first frame to the second frame, at the first side of the first frame; and a second pair of fastening members, that attach the first frame to the second frame, at the second side of the first frame; and a pair of support parts supported on the second frame, the pair of support parts being configured to support end faces of the roll in the first direction, at least one of the pair of support parts being supported on the second frame so as to be movable in the first direction;

a guide member provided on the first frame; and contact portions provided to the support parts, the contact portions being configured to slide while being in contact with the guide member, wherein the pair of support parts comprises a first support part and a second support part, wherein the second frame has a first groove and a second groove each extending in the first direction, wherein the first support part comprises:

a first guide part movably engaged with the first groove, and a first rack member having a first rack gear extending from the first guide part toward one side in the first direction, wherein the second support part comprises:

a second guide part movably engaged with the second groove, and a second rack member having a second rack gear extending from the second guide part toward other side in the first direction, wherein the printing apparatus further comprises a pinion gear provided to the second frame, the pinion gear being in mesh with the first rack gear and the second rack gear, and wherein the contact portions are provided at portions of the first guide part and the second guide part facing the first frame.

2. The printing apparatus according to claim 1, wherein the contact portions comprises first contact portions configured to prevent the first support part and the second support part from falling down in the first direction, each of the first contact portions being provided in a respective one of predetermined first positions of the first guide part and the second guide part.

3. The printing apparatus according to claim 2, wherein the contact portions comprises second contact portions configured to prevent the first support part and the second support part from falling down in a second direction, each of the second contact portions being provided in a respective one of second positions of the first guide part and the second guide part, the second direction being orthogonal to the first direction, the second positions being different from the first positions.

4. The printing apparatus according to claim 1, wherein the first frame comprises a first holding plate part having a substantially rectangular flat plate shape, wherein the second frame comprises a second holding plate part having a substantially rectangular flat plate shape, the second holding plate part having the first groove and the second groove, wherein the first rack member, the second rack member and the pinion gear are disposed to be interposed between the first holding plate part and the second holding plate part, and wherein the first holding plate part and the second holding plate part are fixed at four corner portions, of the first holding plate part, by the first pair of fastening members and the second pair of fastening members, the four corner portions including:

respective end portions on both sides, of the first holding plate part, in the first direction; and respective end portions on both sides, of the first holding plate part, in a second direction, the second direction being orthogonal to the first direction.

5. The printing apparatus according to claim 4, wherein the second holding plate part has a support shaft portion provided at a substantially central position of such second holding plate part, the support shaft portion rotatably supporting the pinion gear inserted therein, wherein the fastening members further include a center fastening member that attaches the first frame to the second frame, at a substantially central position of the first frame between the first side and the second side of the first frame, and wherein the first holding plate part is fixed to the support shaft portion by the center fastening member.

6. The printing apparatus according to claim 4, wherein the first holding plate part has at least one positioning hole, and wherein the second holding plate part has at least one boss inserted and fitted in the positioning hole.

7. The printing apparatus according to claim 1, wherein a surface of the guide member to be in contact with the contact portions has been subjected to a friction resistance reducing treatment.

8. The printing apparatus according to claim 1, wherein the first frame is formed of a fiber reinforced resin material, and wherein the second frame is formed of a normal resin material other than the fiber reinforced resin material.

9. The printing apparatus according to claim 1, wherein the first frame comprises a first holding plate part having a substantially rectangular flat plate shape, wherein the second frame comprises a second holding plate part having a substantially rectangular flat plate shape, the second holding plate part having a groove, wherein the printing apparatus further comprises an adjusting mechanism interposed between the first holding plate part and the second holding plate part, the adjusting mechanism being movably engaged with the groove and configured to interlockingly move the at least one of the pair of support parts in the first direction, wherein the first holding plate part and the second holding plate part are faced in a third direction, the third direction being orthogonal to the first direction, and wherein the contact portions provided to the support parts supported on the second frame protrudes from the adjusting mechanism in the third direction and contactable the guide member provided on the first frame.

10. The printing apparatus according to claim 1, wherein the contact portions always contact the guide member.

11. The printing apparatus according to claim 1, wherein the contact portions are configured to be in contact with the guide member when at least one of the support parts is moved.

12. The printing apparatus according to claim 1, wherein the contact portions are configured to be in contact with the guide member in a case at least one of the support parts is applied with a predetermined force or more.

13. The printing apparatus according to claim 2, wherein each of the first positions is located away from a corresponding one of the first support part and the second support part in the second direction.

14. The printing apparatus according to claim 3, wherein each of the second positions is located away from a corresponding one of the first support part and the second support part in a direction in which the first support part and the second support part are movable of getting away from each other.

15. The printing apparatus according to claim 1, wherein the first frame includes holes, and each of the fastening members passing through a respective one of the holes, each of the fastening members is a screw; and each of the fastening members is fastened into the second frame, so as to secure the first frame to the second frame.

16. The printing apparatus according to claim 1, wherein the fastening members further include a center fastening member that attaches the first frame to the second frame, at a substantially central position of the first frame between the first side and the second side of the first frame.

17. A printing apparatus comprising:

a first frame having a first side and a second side in a first direction;

a second frame fixed to the first frame, the second frame having an accommodation space configured to accommodate a roll, the roll having a printing medium rolled thereon, and the first frame is fixed to the second frame by fastening members, the fastening members including:

a first pair of fastening members, that attach the first frame to the second frame, at the first side of the first frame; and a second pair of fastening members, that attach the first frame to the second frame, at the second side of the first frame; and a pair of support parts supported on the second frame, the pair of support parts being configured to support end faces of the roll in the first direction, at least one of the pair of support parts being supported on the second frame so as to be movable in the first direction;

a guide member provided on the first frame; and contact portions provided to the support parts, the contact portions being configured to slide while being in contact with the guide member, wherein the fastening members further include a center fastening member that attaches the first frame to the second frame, at a substantially central position of the first frame between the first side and the second side of the first frame, the printing apparatus includes a pinion gear that allows the support parts to be moved together;

the first frame includes a hole through which the center fastening member is inserted, the center fastening member is a screw; and the second frame includes a boss that supports the pinion gear, and the screw is fastened with the boss through the hole of the first frame.

18. A printing apparatus comprising:

a first frame having a first side and a second side in a first direction;

a second frame fixed to the first frame, the second frame having an accommodation space configured to accommodate a roll, the roll having a printing medium rolled thereon, and the first frame is fixed to the second frame by fastening members, the fastening members including:

a first pair of fastening members, that attach the first frame to the second frame, at the first side of the first frame; and a second pair of fastening members, that attach the first frame to the second frame, at the second side of the first frame; and a pair of support parts supported on the second frame, the pair of support parts being configured to support end faces of the roll in the first direction, at least one of the pair of support parts being supported on the second frame so as to be movable in the first direction;

a guide member provided on the first frame; and contact portions provided to the support parts, the contact portions being configured to slide while being in contact with the guide member, wherein the fastening members further include a center fastening member that attaches the first frame to the second frame, at a substantially central position of the first frame between the first side and the second side of the first frame, the fastening members are each screws; and the first pair of fastening members and the second pair of fastening members constituting, collectively, a plurality of first fastening members; and the center fastening member constituting a second fastening member.

19. The printing apparatus according to claim 1, wherein the fastening members are each screws.

* * * * *